(12) United States Patent
Swerdlow

(10) Patent No.: US 12,547,985 B2
(45) Date of Patent: Feb. 10, 2026

(54) AUTOMATED SCHEDULING OF BUFFER TIME BLOCKS IN A USER CALENDAR

(71) Applicant: Zoom Communications, Inc., San Jose, CA (US)

(72) Inventor: Aleksandra Swerdlow, Santa Clara, CA (US)

(73) Assignee: Zoom Communications, Inc., San Jose, CA (US)

( * ) Notice: Subject to any disclaimer, the term of this patent is extended or adjusted under 35 U.S.C. 154(b) by 23 days.

(21) Appl. No.: 17/976,460

(22) Filed: Oct. 28, 2022

(65) Prior Publication Data

US 2024/0144194 A1 May 2, 2024

(51) Int. Cl.
G06Q 10/1093 (2023.01)
(52) U.S. Cl.
CPC ................ *G06Q 10/1093* (2013.01)
(58) Field of Classification Search
None
See application file for complete search history.

(56) References Cited

U.S. PATENT DOCUMENTS

| | | | |
|---|---|---|---|
| 7,493,369 B2 | 2/2009 | Horvitz et al. | |
| 7,519,676 B2 | 4/2009 | Horvitz et al. | |
| 8,359,356 B2 | 1/2013 | Belz et al. | |
| 8,423,288 B2* | 4/2013 | Stahl ................... | G01C 21/343 701/457 |
| 8,924,494 B2 | 12/2014 | Belz et al. | |
| 8,965,977 B2 | 2/2015 | Biehl et al. | |
| 10,516,964 B2 | 12/2019 | Dotan-Cohen et al. | |
| 11,645,630 B2* | 5/2023 | Nelson ............... | G06Q 10/1093 705/7.19 |
| 2004/0122721 A1* | 6/2004 | Lasorsa ............... | G06Q 10/109 705/7.24 |
| 2009/0171988 A1 | 7/2009 | Kikin-Gil | |
| 2009/0307038 A1* | 12/2009 | Chakra ............... | G06Q 10/109 705/7.18 |
| 2010/0241483 A1* | 9/2010 | Haynes ............... | G06Q 10/1093 715/764 |
| 2012/0136572 A1* | 5/2012 | Norton ............... | G01C 21/3407 701/465 |
| 2014/0163882 A1* | 6/2014 | Stahl .................... | G04B 19/24 701/540 |

(Continued)

OTHER PUBLICATIONS

Van de Vonder, Stijn, et al. "The use of buffers in project management: The trade-off between stability and makespan." International Journal of production economics 97.2 (2005): 227-240 (Year: 2005).*

(Continued)

*Primary Examiner* — Darlene Garcia-Guerra
(74) *Attorney, Agent, or Firm* — Young Basile Hanlon & MacFarlane, P.C.

(57) ABSTRACT

A digital calendar system that automates the scheduling of buffer time blocks in a user calendar. The buffer time block is for indicating that a presence state of the user is busy during the buffer time block. The digital calendar system updates a user calendar to include an event time block associated with an event for a user of a digital calendar system, generates, based on the event time block, a buffer time block, and updates the user calendar to include the buffer time block temporally adjacent to the event time block.

20 Claims, 12 Drawing Sheets

(56) References Cited

U.S. PATENT DOCUMENTS

| | | | |
|---|---|---|---|
| 2014/0288990 A1* | 9/2014 | Moore | G06Q 10/1093 |
| | | | 705/7.19 |
| 2016/0094938 A1* | 3/2016 | Upadhyaya | H04W 4/029 |
| | | | 455/456.3 |
| 2016/0277325 A1 | 9/2016 | Krishnamurthy et al. | |
| 2018/0167341 A1 | 6/2018 | Bs | |
| 2019/0205839 A1* | 7/2019 | Dotan-Cohen | H04L 67/535 |
| 2022/0329691 A1 | 10/2022 | Chinthakunta et al. | |
| 2022/0334691 A1* | 10/2022 | Robb | G06Q 10/109 |
| 2022/0398546 A1* | 12/2022 | Lightbody | G06F 3/0482 |
| 2024/0095682 A1* | 3/2024 | Lightbody | G06Q 10/1095 |

OTHER PUBLICATIONS

Frandson, Adam G., Olli Seppänen, and Iris D. Tommelein. "Comparison between location based management and takt time planning." 23rd annual conference of the international group for lean construction. Perth, Australia, 2015 (Year: 2015).*

Gonzalez Diaz, Carlos, et al. "Making space for social time: Supporting conversational transitions before, during, and after video meetings." Proceedings of the 1st Annual Meeting of the Symposium on Human-Computer Interaction for Work. 2022 (Year: 2022).*

Lee, Heejin. "Your time and my time: a temporal approach to groupware calendar systems." Information & Management 40.3 (2003): 159-164 (Year: 2003).*

Begole, James Bo, et al. "Work rhythms: analyzing visualizations of awareness histories of distributed groups." Proceedings of the 2002 ACM conference on Computer supported cooperative work. 2002 (Year: 2002).*

* cited by examiner

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | | | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | BUSY 702 | | | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | BUFFER TIME BLOCK 604 | NEW EVENT 602 | | | | | | |

600

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | BUSY 902 | | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | NEW EVENT 602 | BUFFER TIME BLOCK 802 | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | BUSY 1102 | | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | FIRST BUFFER TIME BLOCK 1002 | NEW EVENT 602 | SECOND BUFFER TIME BLOCK 1004 | | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | | | BUSY | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | FIRST BUFFER TIME BLOCK 1202 | | NEW EVENT 602 | SECOND BUFFER TIME BLOCK 1204 | | | | | |

| TIME | | | | | | | | | | |
|---|---|---|---|---|---|---|---|---|---|---|
| | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 | |
| | | THIRD BUFFER TIME BLOCK 1504 | SECOND EVENT 1502 | FOURTH BUFFER TIME BLOCK 1506 | NEW EVENT 1402 | SECOND BUFFER TIME BLOCK 1406 | | | | |

| TIME | | | | | | | | | | |
|---|---|---|---|---|---|---|---|---|---|---|
| | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 | |
| | FIRST BUFFER TIME BLOCK 1404 | | | | NEW EVENT 1402 | SECOND BUFFER TIME BLOCK 1406 | | | | |

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | SECOND EVENT 1704 | BUFFER TIME BLOCK 1702 | EXISTING EVENT 1602 | | | | |

FIG. 17

| TIME | 8:00 TO 9:00 | 9:00 TO 10:00 | 10:00 TO 11:00 | 11:00 TO 12:00 | 12:00 TO 1:00 | 1:00 TO 2:00 | 2:00 TO 3:00 | 3:00 TO 4:00 | 4:00 TO 5:00 |
|---|---|---|---|---|---|---|---|---|---|
| | | | | | EXISTING EVENT 1602 | | | | |

FIG. 16

AUTOMATED SCHEDULING OF BUFFER TIME BLOCKS IN A USER CALENDAR

FIELD

This disclosure relates generally to digital calendars and more specifically, to automated scheduling of buffer time blocks in a user calendar.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 5-17 are example hourly schedule views of a user calendar in a digital calendar system.

DETAILED DESCRIPTION

Figure 1:
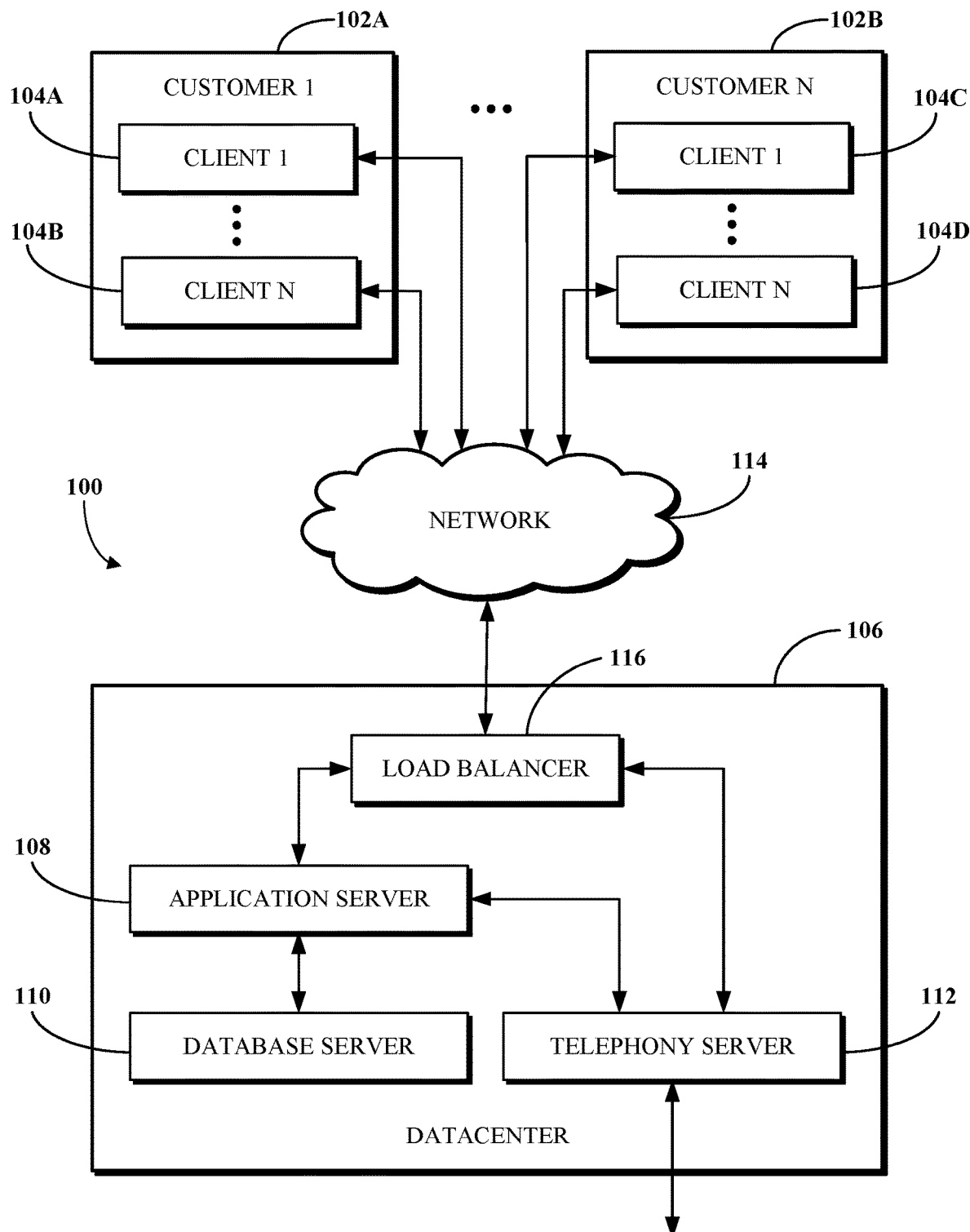
FIG. 1 is a block diagram of an example of an electronic computing and communications system.

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

One particular example of such a communications service, which may be implemented using a UCaaS platform or otherwise, is a digital calendar system that operates to manage the availability of resources such as people, equipment, conference rooms, and other items that require scheduled availability. The digital calendar system further organizes associations between the resources and events. Each person, hereinafter referred to as a user of the digital calendar system, or simply a "user," has an associated user calendar that maintains a schedule for the user including events and resources associated with the user. The user calendar includes sequential time blocks occurring throughout each day. When the user adds an event to their user calendar, the event is associated with a time block of the user calendar corresponding to the time during which the event is scheduled to take place. Unless otherwise occupied by a time block associated with an event, the user calendar indicates that the user is available during a time block. In some instances, details of events associated with time blocks in a user calendar are not visible to other users of the digital calendar system. In place of the event details, the digital calendar system may simply indicate that the user is "busy" during that block of time or that the user is otherwise unavailable.

A user typically is not available at all times for which there are no events scheduled on their user calendar. For example, a user may need time to work on a project free from distraction, may need to prepare for an event immediately before the event, or perform a post event procedure that can occupy the user's time. In a conventional digital calendar system, a user can manually indicate that they are not available at such times by changing their presence state that is displayed to other users. For example, they may select a status of "busy," "do not disturb," or "out of office." Alternatively, the user may manually schedule a private event inviting only themselves for the times at which they do not want to be seen by other users as available. For example, a user can schedule a private event immediately before an event to indicate to other users that they are busy. Other users viewing the user calendar are typically only able to see that the user is busy, but they are not able to see what the user is busy doing.

Conventional digital calendar systems can thus result in a user being overscheduled with not enough time to work on other tasks. For example, if a user sees an opening in another user's schedule, they may assume that the other user is free during the open time and schedule a conference with the other user. Unless a user actively manages their presence state, schedules personal events to perform tasks, or actively manages their presence state and schedules personal events to perform tasks, each of which requiring considerable attention and time, openings will appear to exist in the user's schedule and thus be improperly represented as times at which the user is available. These openings often appear at times that a user needs to prepare for events or work undisturbed.

Implementations of this disclosure address problems such as these by automating the scheduling of buffer time blocks in a user calendar for indicating to other users that they are not available. The buffer time blocks are blocks of time determined by a digital calendar system implementing the user calendar for indicating that a user is busy or otherwise occupied and reduce the likelihood that another user will try to schedule an event when a user needs undisturbed time. The digital calendar system schedules the buffer time blocks based on a user preference, historical activity of the user, or both user preferences and historical activity of the user. Implementations of this disclosure schedule the buffer time blocks independent of the calendar system receiving a request to schedule a buffer time block and enable a user to have scheduled time to focus on work tasks. The implementations of this disclosure do so without requiring the user to perform unproductive tasks such as actively managing a presence state and scheduling private events to provide uninterrupted time to perform work tasks. In particular, the digital calendar system disclosed herein can determine to schedule a buffer time block by learning patterns in the preferences and/or activities of the user as they relate to the scheduling of events on the user calendar, for example, by leveraging historical event data of the user calendar. The implementations of this disclosure thus describe automated approaches to detecting misrepresentations of user availability within a user calendar facilitated by a digital calendar system and resolving such misrepresentations by introducing new calendar events, as buffer time blocks, to the user calendar to cause a change in a presence state of the user represented or otherwise accessible to other users of the digital calendar system.

To describe some implementations in greater detail, reference is first made to examples of hardware and software structures used to implement a digital calendar system with automated scheduling of buffer time blocks in a user calendar. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UcaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UcaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UcaaS platform. For example, the application server 108 can implement all or a portion of a UcaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
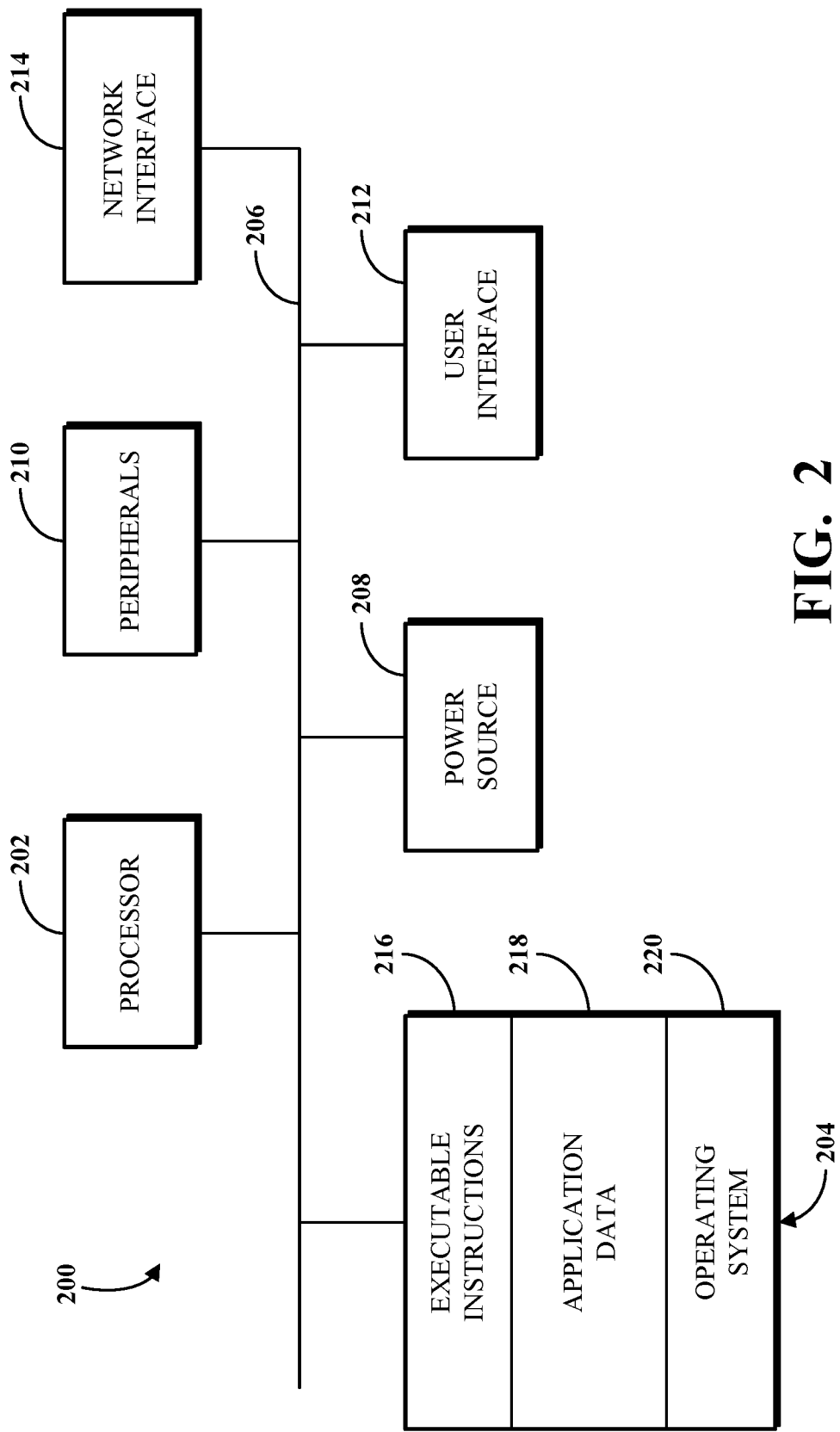
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
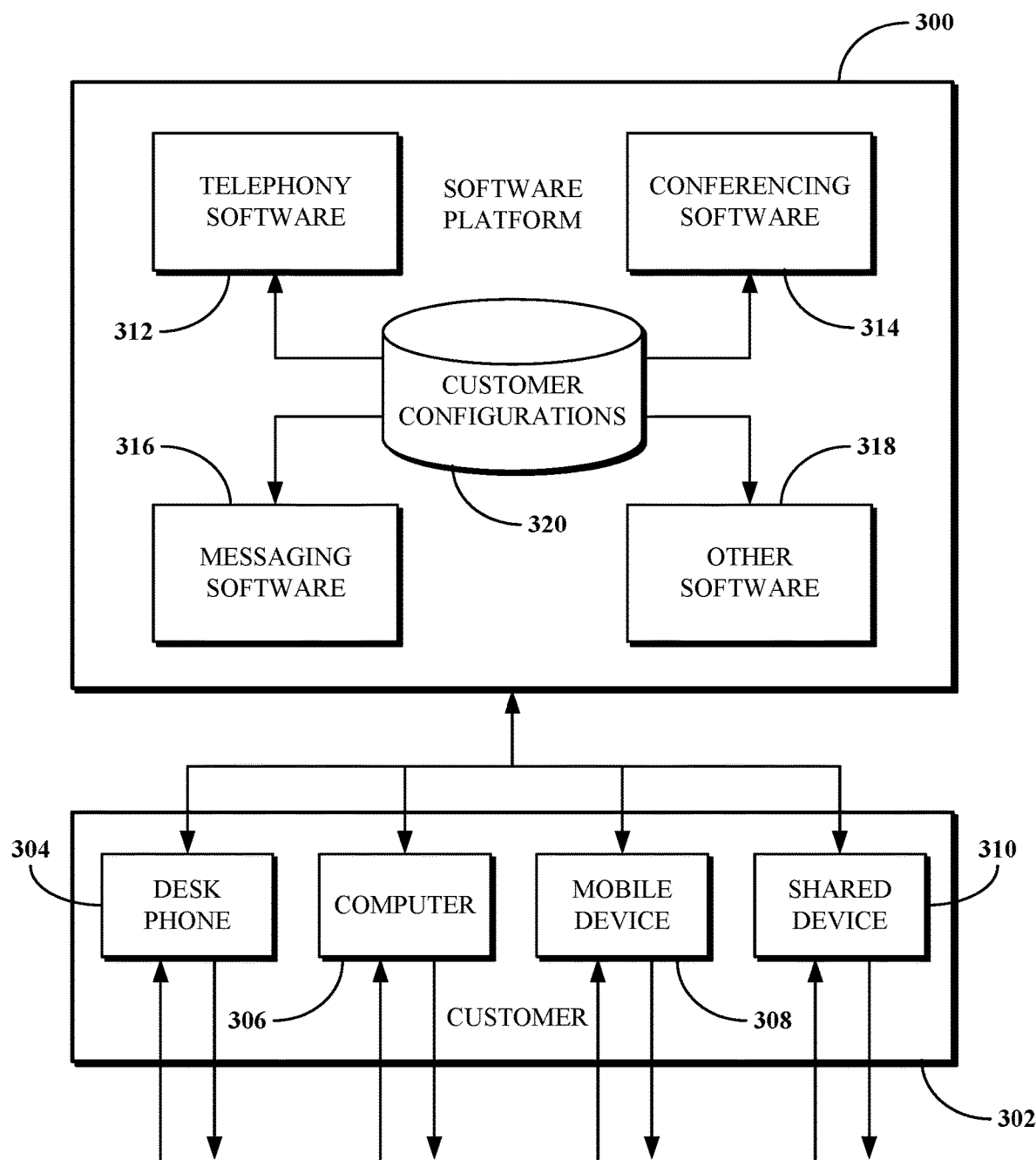
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UcaaS platform accessible by clients of a customer of a UcaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include digital calendar software for implementing user calendars for users of the software platform 300 as well as for the automated scheduling of buffer time blocks in such a user calendar. In some cases, the other software 318 may include email software of the software platform 300 (e.g., server-side software to which an email client running at one of the clients 304 through 310 may connect to access and use email services of the software platform 300). In some such cases, the digital calendar software may be included in the email software.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
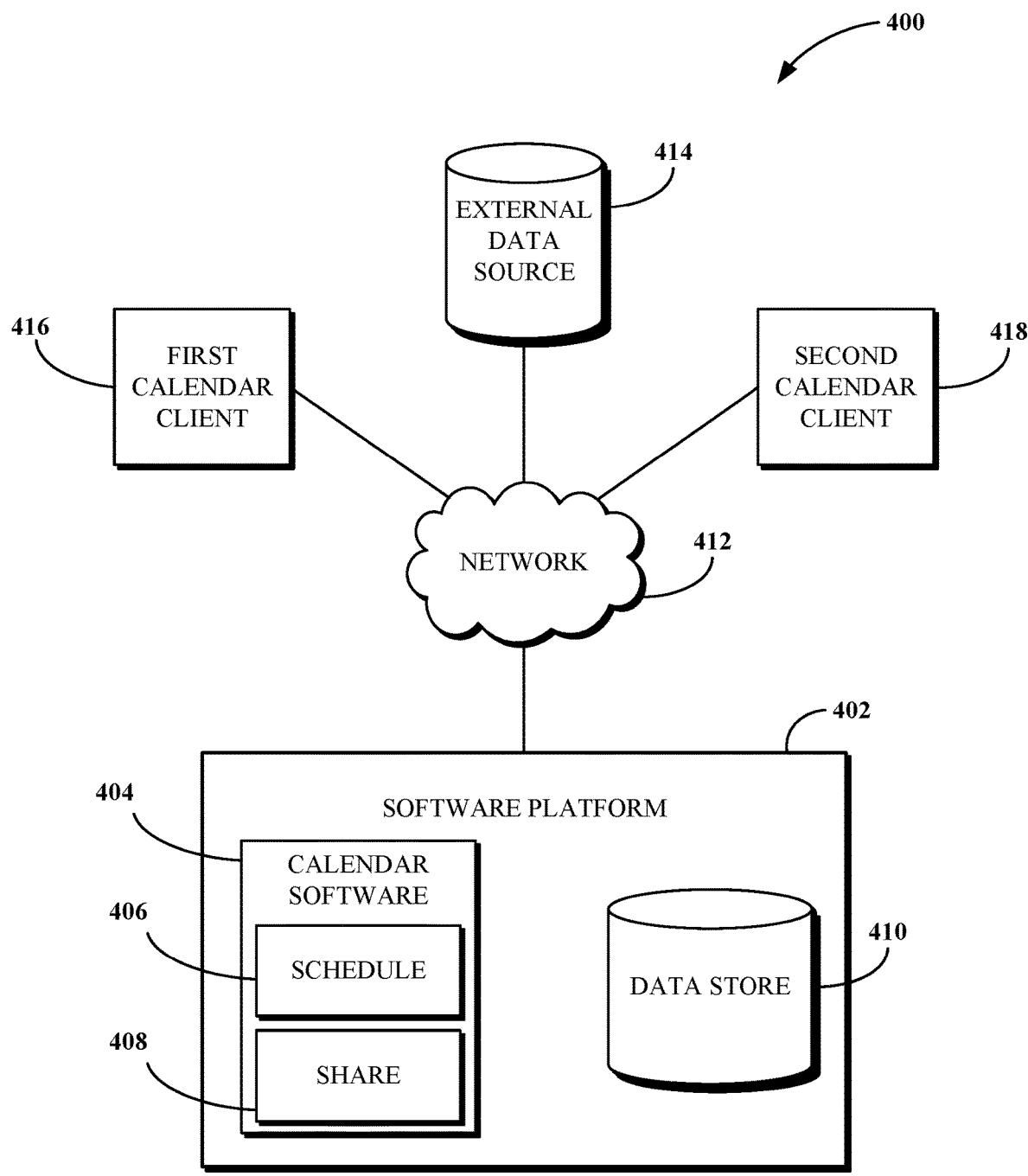
FIG. 4 is a block diagram of a software platform of a digital calendar system implemented by an electronic computing and communication system.

FIG. 4 is a block diagram of an example of a digital calendar system 400 including first and second calendar clients 416, 418, and a software platform 402 implemented by an electronic computing and communications system, for example, the system 100 shown in FIG. 1. The software platform 402, which may, for example, be the software platform 300, includes calendar software 404 that provides digital calendar services to a first user operating a first calendar client 416 and a second user operating a second calendar client 418. The calendar clients 416, 418 are computer software components implemented at a respective client device that enable a user to interact with the calendar software 404. The calendar clients 416, 418 can be integrated in a user application such as communication software, a personal information manager, or conferencing software.

The calendar software 404 enables users, such as the first user and the second user, of the digital calendar system 400 to save user calendars, schedule events in the user calendars, invite other users to events, share user calendars with other users, and set preferences for interacting with the calendar software 404. The calendar software 404 further controls other aspects of digital calendar use based on user preferences including automating the scheduling of buffer time blocks in a user calendar. To implement this functionality, the calendar software 404 includes a schedule component 406 and a share component 408. The schedule component 406 is operable to update a user calendar to associate time blocks with events to generate event time blocks and generate buffer time blocks temporally adjacent to the event time blocks. The schedule component 406 also determines when a buffer time block should begin and end and whether the buffer time block should occur before or after an event time block in the user calendar. The share component 408 is operable to share portions of the user calendar and determines what information to share with other users depending on their identity and preferences of the user.

The software platform 402 includes a data store 410 operable to store user calendars, resource calendars, event information, user preferences, and other user data. In some instances, the data store 410 can be implemented in an external data source 414 in communication with the software platform 402 by way of a network 412. In some cases, the data store may be, include, or be included in the customer configurations 320.

The first and second calendar clients 416, 418 interface with the calendar software 404 and allow a user operating one of the first and second calendar clients 416, 418 to interact with the calendar software 404. In the examples that follow, the first user operates the first calendar client 416 to interact with the calendar software 404 to add events to their user calendar and share their user calendar with the second user. The calendar software 404 adds buffer time blocks to the user calendar responsive to the user adding events to user calendar as will be described hereafter. Although the calendar software 404 is described in relation to the first user adding an event to their user calendar, the second user can operate the second calendar client 418 in the same manner as described with reference to the first user. Additional users are possible, and examples are not limited to the first user and the second user.

To add an event to a user calendar, the schedule component 406 associates time blocks in the user calendar with the event being added. In some instances, the first user creates a new event and adds the new event to their user calendar using the first calendar client 416. For example, the first user can use the first calendar client 416 to create a conference and add the conference to their user calendar. The schedule component 406 associates the conference with a block of time in the user calendar corresponding to the time that the conference is scheduled for. In another instance, the user can receive an invitation to an event created by a different user. For example, the second user can make use of the second calendar client 418 to schedule a conference and invite the first user to attend the conference. The first user receives an invitation to the conference by way of the first calendar client 416. The schedule component 406 associates the conference with a time block in the first user calendar corresponding to the time the conference is scheduled for in response to the first user accepting the invitation. Each event has a scheduled start time and a scheduled end time. Thus, when adding a new event to the user calendar, the schedule component 406 associates a time block beginning at the scheduled start time and ending at the scheduled end time with the new event. In some instances, the schedule component 406 does not associate an event with the user calendar unless the user formally accepts the invitation. In other instances, the schedule component 406 may tentatively associate the event with the user calendar prior to the user accepting the invitation.

The schedule component 406 is further configured to generate user-defined buffer time blocks in the user calendar. A user-defined buffer time block is a period of time in which no actual event is scheduled for the user, but the user calendar indicates to other users that the user is busy. For example, a user may know that they do not want any events scheduled for a block of time in the future. The first user can operate the first calendar client 416 to interface with the calendar software 404 to generate a user-defined buffer time block. The user-defined buffer time block is visible to the user as available time, but other users are only able to view the time as busy. Thus, a user can still schedule events and accept invitations for events during the user-defined buffer time. As will be explained in relation to FIG. 15, the schedule component 406 is configured to generate new buffer time blocks when an event is associated with an event time block that overlaps with an existing buffer time block and remove the existing buffer time block.

The schedule component 406 is further configured to automate the generation of buffer time blocks in the user calendar adjacent new events. A buffer time block is similar to a user-defined buffer time block in that it is a period of time in which no actual event is scheduled for the user, but the user calendar indicates that the user is busy. However, the buffer time block is generated automatically by the schedule component 406 independent of (e.g., without requiring) a user input of the buffer time block. For instance, the first user may desire time to prepare for a conference before the scheduled start time, time to process the conference after the scheduled end time or may simply need uninterrupted time during the day. A buffer time block in the user calendar is used for indicating to other users that the user is busy without requiring the user to manually change their status or adjust their schedule.

The first user can use the first calendar client 416 to store a default presence state for the user calendar including user preferences for generating buffer time blocks in the data store 410. When the schedule component 406 associates an event with a time block in a user calendar, the schedule component 406 can reference the user preferences stored in the data store 410 to determine how a buffer time block should be added to the user calendar. Examples of user preferences include whether buffer time blocks are active, a default buffer time block duration, a before/after buffer time block scheduling option, a user-defined buffer time block start time, a user-defined buffer time block end time, an option to learn the user's preferences for buffer time blocks, and an option to fill time between events.

The buffer time block active preference is a user preference indicating whether the schedule component 406 should add buffer time blocks to the user calendar when scheduling new events. If the preference indicates that the buffer time blocks are active, the schedule component 406 adds buffer time block to the user calendar in accordance with the user preferences. When the preference indicates that the buffer time blocks are not active, the schedule component 406 does not add buffer time blocks to the user calendar in response to scheduling an event.

The buffer time block duration user preference indicates a user-defined duration for a buffer time block. For example, if the user-defined duration is one hour, the schedule component 406 will schedule buffer time blocks that last one hour. In some instances, a user may specify different buffer time block durations for buffer time blocks preceding an event time block and buffer time blocks following an event time bock. For example, a user may prefer a two-hour buffer time block ahead of an event time block for preparation and a one-hour buffer time block after an event time block. In such instances, the schedule component 406 can schedule a two-hour buffer time block before an event time block associated with a new event and a one-hour buffer time block after the event time block.

The before/after option specifies if the schedule component 406 should schedule a buffer time block before an event time block, after an event time block, or both before and after the event time block.

A user-defined start time indicates a time that a buffer time block should start. For example, in place of the schedule component 406 scheduling a buffer time block for an hour before the event time block, the schedule component 406 can begin the buffer time block at the user-defined start time and end the buffer time block when the event time block begins. Thus, in such examples, the user may schedule their entire morning to be identified as busy by the buffer time block when an event is scheduled by setting the user-defined start time to coincide with the beginning of their workday.

The user-defined end time indicates a time that a buffer time block should end. For example, in place of the schedule component 406 scheduling a buffer time block for an hour after the event time block, the schedule component 406 can begin the buffer time block at the end of an event time block and end the buffer time block at the user-defined end time. Thus, in such examples the user may schedule the remainder of their day as busy as indicated by the buffer time block by setting the user-defined end time to coincide with the end of their workday.

The option to learn the user's preferences allows the schedule component 406 to learn, based on past user behavior to learn the style of buffer time block that should be added to the user calendar in response to adding an event to the user calendar. For example, if a user regularly adds a buffer time block for a half hour before events, the schedule component 406 learns to schedule a half-hour buffer time block before events. Or, if the user regularly adds a larger buffer time block when an event involves a certain user, the schedule component 406 can learn to schedule larger buffer time blocks when the certain user is recognized as being scheduled for the event. In another example, the schedule component 406 learns times of the day in which a user regularly indicates their status as busy. The schedule component 406 can learn the times and schedule buffer time blocks for the time that the user normally marks their status as busy.

In some instances, a user may schedule an event during a buffer time block. For example, the first user can have a buffer time block that occupies an entire day but receive an invitation from the second user for an event that occurs during that day. In such instances, the schedule component 406 updates the user calendar to remove the existing buffer time block, associate the event with an event time block, and add new buffer time blocks to fill the duration of the existing buffer time block. In such instances, a first new buffer time block is scheduled that begins at the beginning of the existing buffer time block and ends at the beginning of the new event time block. A second buffer time block is scheduled to begin at the end of the new event time block and end at the time the existing buffer time blocks ended. For example, if the first user had a buffer time block that lasted from 8:00 a.m. to 5:00 p.m., and accepted an invitation to attend an event from 1:00 p.m. to 2:00 p.m., the schedule component 406 would update the user calendar to add a first buffer time block starting at 8:00 a.m. and ending at 1:00 p.m., add an event time block for the event starting at 1:00 and ending at 2:00, add a second buffer time block starting at 2:00 and ending at 5:00, and remove the original buffer time block lasting from 8:00 to 5:00. Thus, the user can schedule an event during a buffer time block and the schedule component 406 updates the user calendar to remove overlapping entries so that a buffer time block and an event time block do not occur at the same time.

The share component 408 shares a user calendar with the first and second calendar clients 416, 418 for display as a schedule view to a user. The share component 408 shares information in the user calendar based on the identity of the user viewing the user calendar so that a user is only able to view allowed information. For example, the first user can operate the first calendar client 416 to view their user calendar. The share component provides the first calendar client 416 with a complete view of the user calendar since the first user owns the user calendar and is allowed to view the entirety of their own user calendar. However, the second user operating the second calendar client 418 is not allowed to view the entirety of the first user's user calendar. Instead, in some instances, the share component 408 displays only the presence of the first user. For example, the share component 408 indicates to the second user the time that the first user is busy, with no further indication as to whether they are busy due to an event time block or a buffer time block. In some instances, a user may opt to display additional information to other users, such as a name of a specific event. Or, in some instances, the user may opt to shared information about an event associated with an event time block in the user calendar with another user if the other user is also attending the event.

In some implementations, the calendar software 404 may be implemented by or otherwise included in email software of the software platform 402. For example, the first and second calendar clients 416, 418 may be email clients configured to communicate with the email software to, in relevant part, use the schedule component 406 and the share component 408 as same are described above. In another example, the first and second calendar clients 416, 418 may be client applications (e.g., of a UCaaS or other software platform) each including or otherwise accessing an email client configured to communicate with the email software to, in relevant part, use the schedule component 406 and the share component 408 as same are described above. In either such case, via an email client as described herein, a user may access and use their user calendar in the manner as described above, and may in at least some cases view information associated with user calendars of other users, such as within a graphical user interface of the email client.

FIGS. 5-12 are example hourly schedule views of a user calendar in a digital calendar system, for example, the digital calendar system 400. An hourly schedule view is a view of a single day of a user calendar that is divided by time blocks. The hourly schedule view is one possible type of a view of a user calendar. Other types of views are possible such as a weekly schedule view or a monthly schedule view. In the following description, the hourly schedule view will be used since the hourly schedule view can provide more detail than other schedule views. FIG. 5 is an example of an hourly schedule view 500 in which no events are scheduled for a user. The hourly schedule view 500 is presented as a table with each row representing a time block in the user calendar. The hourly schedule view 500 begins at 8:00 a.m. and ends at 5:00 p.m., but other time spans are possible. In some instances, a user can scroll through the hourly schedule view 500 to view other time blocks that occur before or after the time blocks visible in the hourly schedule view 500.

The hourly schedule view 500 has a time column 502 that displays a time range for each time block. In the example of FIG. 5, each time block corresponds to a one-hour duration, but other durations of time blocks are possible. In addition, an event time block in a user calendar does not need to align with the displayed time blocks. For example, an event time block can begin midway through a time block and end before the end of a time block.

The hourly schedule view 500 of FIG. 5 does not have any events associated with the displayed time blocks. This view can represent a user who does not have any events scheduled for a day represented by the hourly schedule view 500. Referring to FIG. 4, the first calendar client 416 would present this hourly schedule view 500 to the first user if the first user did not have any events scheduled. Additionally, since the hourly schedule view of FIG. 5 contains no event information, the second calendar client 418 would present this view to the second user when viewing the user calendar associated with the first user. The hourly schedule view 500 with no event information shown indicates that the user associated with the user calendar has no events scheduled. Thus, the second user can view the hourly schedule view 500 of the first user's user calendar, see that no events are scheduled, and schedule an event to include the first user. Or the first user can look at their hourly schedule view 500, see they do not have any events scheduled and schedule an event.

FIG. 6 illustrates an hourly schedule view 600 that is similar to the hourly schedule view 500 of FIG. 5, but with a new event scheduled associated with event time block 602 which occurs from 10:00 to 11:00. For example, a user can create the new event and associate the new event with event time block 602, or the user can accept an invitation for the new event and associate the new event with event time block 602. In this example, the schedule component 406 adds a buffer time block 604 in response to the event time block 602 being included in the user calendar. The schedule component 406 can add the buffer time block 604 to the user calendar independent of user input identifying the buffer time block 604. In other words, the schedule component 406 adds the buffer time block 604 without user input identifying the time for the buffer time block 604 or an input indicating that the buffer time block 604 should be added to the user calendar.

In the example of FIG. 6, the schedule component 406 adds the buffer time block 604 immediately before the event time block 602 and for a duration of one hour. The example of FIG. 6 corresponds to a user preference indicating that a buffer time block should be added prior to new event time blocks and that the buffer time block should have a duration of one hour. Thus, each time the schedule component 406 associates a new event with an event time block in the user calendar, the schedule component 406 also adds the buffer time block 604 of one hour duration prior to the event time block 602.

The hourly schedule view 600 of FIG. 6 is displayed as it would be presented to the owner of the user calendar. FIG. 7 is an example of an hourly schedule view 700 of the user calendar including the event time block 602 and the buffer time block 604 as the hourly schedule view 700 would be presented to a user who is not the owner of the user calendar. In the hourly schedule view 700, the information about the new event in the event time block 602 and the buffer time block 604 is not shown and the hourly schedule view 700 only displays a busy time block 702 between 9:00 and 11:00. Thus, a user other than the owner of the user calendar can see that the owner of the user calendar is busy between 9:00 and 11:00 but is unable to view what the owner of the user calendar is busy doing. A user can use the hourly schedule view 700 of FIG. 7 to schedule a conference including the owner of the user calendar and avoid scheduling when the owner of the user calendar is busy, Additionally, since the information for the buffer time block 604 and the event time block 602 is not displayed, the user is unable to see that the owner of the user calendar is not actually participating in an event during the buffer time block 604. If the user were to instead view that the owner of the user calendar is not participating in an event, the user might attempt to schedule an event during that time despite the owner of the calendar being busy.

FIG. 8 is an example of an hourly schedule view 800 as presented to the owner of the user calendar in which the new event is associated with event time block 602 and the schedule component 406 adds a buffer time block after the event time block 602. In this example, the user preferences indicate that the buffer time block 802 should be added after the event time block 602 and that the duration of the buffer time block should be a half hour. Thus, in this instance, the schedule component 406 adds the buffer time block 802 to the user calendar after the event time block 602 and the buffer time block 802 has a duration of a half hour.

FIG. 9 is an example of an hourly schedule view 900 corresponding to the hourly schedule view 800 of FIG. 8, but as presented to a user that is not the owner of the user calendar. In this example, the user who is not an owner of the user calendar is only able to view a busy time block 902 corresponding to the event time block 602 and the buffer time block 802.

FIG. 10 is an example of an hourly schedule view 1000 as presented to the owner of the user calendar in which the new event is associated with event time block 602 and the schedule component 406 adds a first buffer time block 1002 before the event time block 602 and a second buffer time block 1004 after the event time block 602. In this example, the user preferences indicate that a first buffer time block should be scheduled before the event time block with a duration of an hour and a half and that a second buffer time block should be scheduled after the event time block with a duration of an hour. Thus, in this instance, two buffer time blocks 1002, 1004 are added to the user calendar with the first buffer time block 1002 having a duration of an hour and a half and the second buffer time block 1004 having a duration of an hour.

FIG. 11 is an example of an hourly schedule view 1100 corresponding to the hourly schedule view 1000 of FIG. 10, but as presented to a user that is not the owner of the user calendar. In this example, the hourly schedule view 1100 displays a busy time block 1102 to the user who is not an owner of the user calendar corresponding to the event time block 602, the first buffer time block 1002, and the second buffer time block 1004.

FIG. 12 is an example of an hourly schedule view 1200 as presented to the owner of the user calendar in which the new event is associated with the event time block 602 and the schedule component 406 adds a first buffer time block 12002 before the event time block 602 and a second buffer time block 1204 after the event time block 602. In this example, the user preferences indicate that the first buffer time block should be scheduled before the event with a start time of 8:00 a.m. and a second buffer time block should be scheduled after the event with an end time of 5:00. Thus, in this instance, two buffer time blocks are added to the user calendar with the first buffer time block 1202 beginning at 8:00 a.m. and ending at the beginning of the event time block 602 and a second buffer time block 1204 beginning at the end of the event time block 602 and ending at 5:00. In this example, any time an event is associated with an event time block in the user calendar, the schedule component 406 fills the remainder of the day with buffer time blocks. Thus, a user employing these preferences would be unlikely to have more than a single event scheduled in a day.

FIG. 13 is an example of an hourly schedule view 1300 corresponding to the hourly schedule view 1200 of FIG. 12, but as presented to a user that is not the owner of the user calendar. In this example, the hourly schedule view 1300 displays a busy time block 1302 corresponding to the event time block 602, the first buffer time block 1202, and the second buffer time block 1204 to the user who is not an owner of the user calendar.

FIG. 14 is an example of an hourly schedule view 1400 as presented to the owner of the user calendar in which a new event is associated with a new event time block 1402 and the schedule component 406 adds a first buffer time block 1404 before the new event time block 1402 and a second buffer time block 1406 after the new event time block 1402. In this example, like the example of FIG. 12, the user preferences indicate that a first buffer time block should be scheduled before the event with a start time of 8:00 a.m. and a second buffer time block should be scheduled after the event with an end time of 5:00. However, in this instance the new event time block 1402 occurs at a different time of day than the event time block 602 of FIG. 12. Thus, in this instance, two buffer time blocks are added to the user calendar with the first buffer time block 1202 beginning at 8:00 a.m. and ending at the beginning of the new event time block 1402 and a second buffer time block 1204 beginning at the end of the new event time block 1402 and ending at 5:00. In this example, an hourly schedule view for a user that is not an owner of the user calendar would appear the same as the hourly schedule view 1300 of FIG. 13. Thus, although the new event is associated with a different event time block, other users are only able to observe that the entire day of the owner of the user calendar is busy.

FIG. 15 is an example of an hourly schedule view 1500 as presented to the owner of the user calendar in which a second event is associated with a second event time block 1502 in the user calendar of FIG. 14 during the first buffer time block 1404. For example, the owner of the calendar may decide to schedule an event during the first buffer time block 1404 or accept an invitation for an event occurring during the first buffer time block 1404. In this instance, the schedule component 406 adds a third buffer time block 1504 and a fourth buffer time block 1506 to the user calendar and associates the second event with a second event time block 1502. The third buffer time block 1504 begins at a time corresponding to the beginning of the first buffer time block 1404 and ends at the beginning of the second event time block 1502. The fourth buffer time block 1506 begins at an end of the second event time block 1502 and ends at the beginning of the new event time block 1402. The original, first buffer time block 1404 is removed so that no time blocks overlap with one another. Thus, the third buffer time block 1504, the second event time block 1502, and the fourth buffer time block 1506 replace the original, first buffer time block 1404 to fill the user calendar. Thus, the owner of the user calendar remains busy for the entire day and a user other than the owner of the user calendar would continue to see the hourly schedule view 1300 of FIG. 13 when viewing an hourly schedule view of the user calendar.

FIG. 16 illustrates an hourly schedule view 1600 as shown to an owner of a user calendar in which a single event is associated with an existing event time block 1602. In this example, the schedule component 406 is configured to add a buffer time block between event time blocks, but not necessarily before or after an event time block. Thus, with a single event associated with the existing event time block 1602, the schedule component 406 does not add any buffer time blocks to the user calendar.

FIG. 17 illustrates an hourly schedule view 1700 that corresponds to the user calendar of FIG. 16, but with a second event being associated with a second event time block 1704 before the existing event time block 1602. In this example, a user preference indicates that the schedule component 406 should fill the time between event time blocks. Thus, in response to identifying a second event associated with a second event time block 1704, the schedule component 406 adds a buffer time block 1702 between the second event time block 1704 and the existing event time block 1602. The buffer time block 1702 begins when the second event time block 1704 ends and ends when the existing event time block 1602 begins. Thus, this user preference operates to identify the time block between event time blocks as busy for a user. In some instances, the time between event time blocks may extend beyond a single day. For example, the user preference may allow buffer time blocks to span multiple days. Thus, if an event is associated with an event time block and there is an existing event time block the next day, or within a number of days specified in the user preference, the schedule component 406 can schedule a buffer time block to span the time between the new event time block and the existing event time block.

Figure 18:
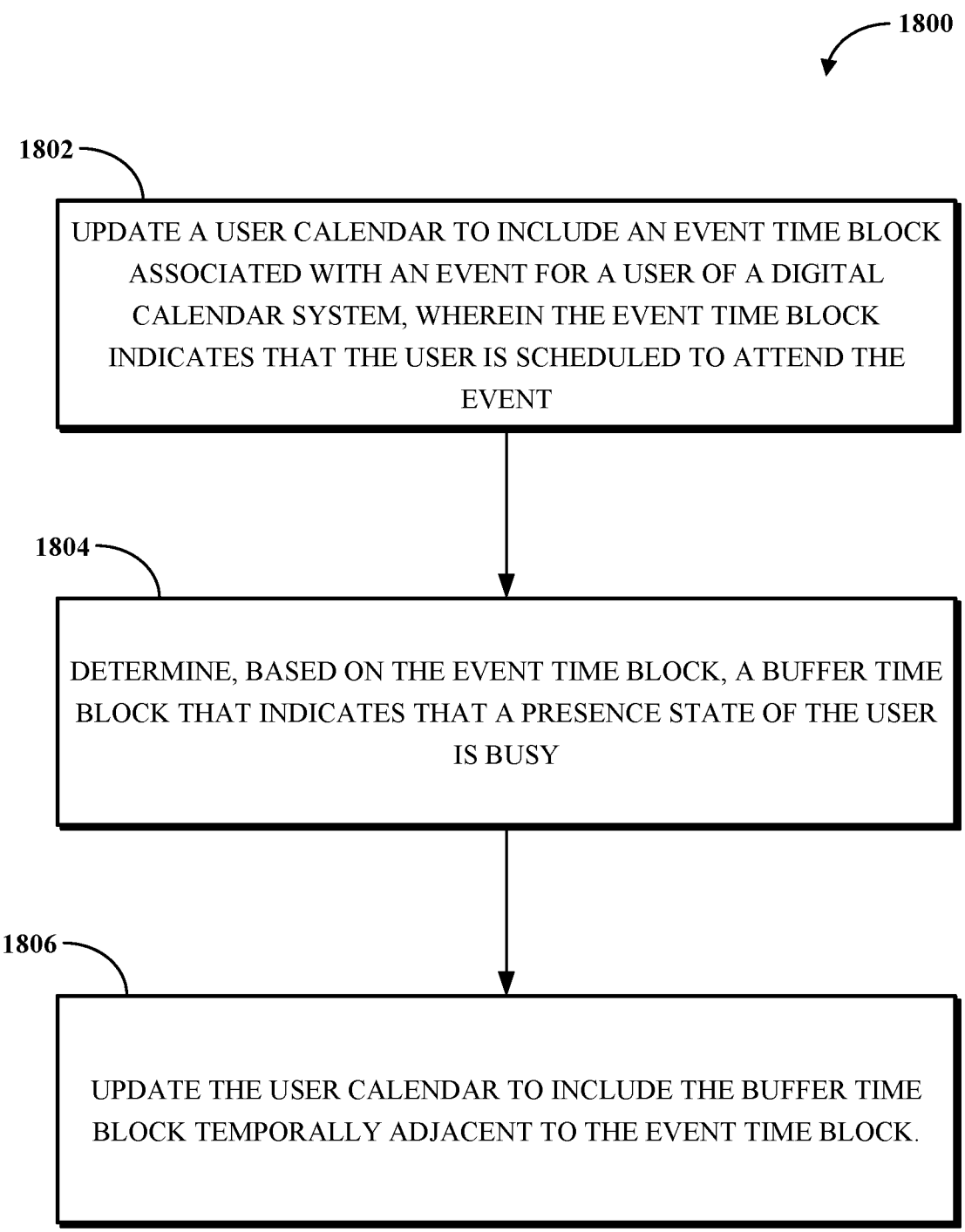
FIG. 18 is a flowchart of an example of a technique for automated scheduling of buffer time blocks in a user calendar.

To further describe some implementations in greater detail, reference is next made to examples of techniques which may be performed by or using a calendar service. FIG. 18 is a flowchart of an example of a technique 1800 for automated scheduling of busy time blocks in a user calendar. The technique 1800 can be executed using computing devices, such as the systems, hardware, and software described with respect to FIGS. 1-4. The technique 1800 can be performed, for example, by executing a machine-readable program or other computer-executable instructions, such as routines, instructions, programs, or other code. The steps, or operations, of the technique 1800 or another technique, method, process, or algorithm described in connection with the implementations disclosed herein can be implemented directly in hardware, firmware, software executed by hardware, circuitry, or a combination thereof.

For simplicity of explanation, the technique 1800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1802, a user calendar is updated to include an event time block associated with an event for a user of a digital calendar system. The event time block indicates that the user is scheduled to attend the event. The user calendar can be updated in response to a user creating an event and adding the event to their user calendar. The digital calendar system updates the user calendar to associate the event with an event time block in the user calendar corresponding to the time of the event. In other instances, the user calendar can be updated in response to the user accepting an invitation to an event. The digital calendar system updates the user calendar to associate the event with an event time block in the user calendar corresponding to the time of the event. The event time block indicates to the user that they are scheduled to attend the event associated with the event time block.

In some implementations, the schedule component 406 of FIG. 4 updates the user calendar to include the event time block associated with an event for a user of the digital calendar system 400. The first user may operate the first calendar client 416 to interact with the calendar software 404 to schedule the event. The first user can either use the first calendar client 416 to add an event to their user calendar and the calendar software 404 associates the event with an event time block or the user can accept an invitation for an event from another user and the calendar software 404 can associate the event with an event time block in the user calendar. The share component 408 can update the first calendar client 416 to indicate that the user is scheduled to attend the event. The share component 408 can further provide information to the second calendar client 418 for indicating that the user's presence state is busy during the event time block.

At 1804, a buffer time block is generated for indicating that a presence state of the user is busy. The buffer time block is generated automatically by the digital calendar system in response to the event time block being included in the user calendar. The buffer time block is generated automatically according to preferences of the user as described previously. Although the buffer time block is generated automatically according to the user preferences, no manual user input is required to generate the buffer time block. In other words, although the user preferences are used to determine the placement and duration of the buffer time block, the calendar system does not require any user input after the event is associated with the event time block to generate the buffer time block. The user preferences can control the duration of the buffer time block, the start time of the buffer time block, the end time of the buffer time block, whether the buffer time block is before or after the event time block, whether buffer time blocks should occur both before and after the event time block, and whether the buffer time block should span an interval between event time blocks in the user calendar. For instance, a user may prefer to have time set aside prior to an event to prepare for an event. In such instances, the user preference would indicate to schedule a buffer time block before an event. In another instance, the user may prefer to set aside time after an event. In such instances, the user preference would indicate to schedule a buffer time block after an event. Or, in still other instances, the user may prefer to have time set aside both before and after an event. In such instances the user preference would indicate both to schedule a buffer time block before an event and after an event. The user preference for spanning an interval between event time blocks instructs the calendar software 404 to generate a buffer time block between events. For example, a user may prefer to have uninterrupted time between events.

In some implementations, the schedule component 406 of FIG. 4 generates the buffer time block according to the user preferences. The schedule component 406 can access the user preferences stored in the data store 410 or stored in the external data source 414. In some instances, the schedule component 406 can learn the users preferred buffer time blocks by analyzing the history of the user and their presence settings. In such implementations, the schedule component 406 can generate the buffer time block based on an estimation of a preferred user buffer time block.

At 1806, the user calendar is updated to include the buffer time block temporally adjacent to the event time block. The user calendar is updated automatically responsive to the buffer time block being generated and without requiring a user input to update the calendar. The buffer time blocks are scheduled in the user calendar so that no time openings exist between the buffer time blocks and the event time block. Thus, to a user other than the owner of the user calendar, the buffer time block and the event time block can appear as a continuous span of a busy presence state for the owner of the user calendar. In some implementations, the schedule component 406 of FIG. 4 updates the user calendar to include the buffer time blocks temporally adjacent to the event time blocks responsive to the schedule component 406 generating the event time block.

In some implementations, a presence state of a user during a time corresponding to a buffer time block may differ from a presence state of the user indicated at a time corresponding to an event time block. For example, the presence state of the user during a time corresponding to a buffer time block may appear as "do not disturb" and the presence state of the user during a time corresponding to the event time block may appear as "in a meeting." The presence state for each time block may be set using a default presence state which can be a user preference or setting for the digital calendar system. Additionally, in some implementations, a user may override the presence state associated with a time block in their user calendar. For example, rather than deleting a buffer time block, the user may manually select a presence state of "available" if they decide that they do not want their presence state shown as busy.

The implementations of this disclosure correspond to methods, non-transitory computer readable media, apparatuses, systems, devices, and the like. In some implementations, a method comprises updating a user calendar to include an event time block associated with an event for a user of a digital calendar system, wherein the event time block indicates that the user is scheduled to attend the event; generating, based on the event time block, a buffer time block for indicating that a presence state of the user is busy; and updating the user calendar to include the buffer time block temporally adjacent to the event time block. In some implementations, an apparatus comprises a memory; and a processor configured to execute instructions stored in the memory to: update a user calendar to include an event time block associated with an event for a user of a digital calendar system, wherein the event time block indicates that the user is scheduled to attend the event; generate, based on the event time block, a buffer time block that for indicating that a presence state of the user is busy; and update the user calendar to include the buffer time block temporally adjacent to the event time block. In some implementations, a non-transitory computer readable medium stores instructions operable to cause one or more processors to perform operations comprising updating a user calendar to include an event time block associated with an event for a user of a digital calendar system, wherein the event time block indicates that the user is scheduled to attend the event; generating, based on the event time block, a buffer time block for indicating that a presence state of the user is busy; and updating the user calendar to include the buffer time block temporally adjacent to the event time block.

In some implementations of the method, non-transitory computer readable medium, or apparatus, generating the buffer time block is based on a user setting for a default presence state.

In some implementations of the method, non-transitory computer readable medium, or apparatus, generating the buffer time block is in view of past user presence states in relation to past events in the user calendar.

In some implementations of the method, non-transitory computer readable medium, or apparatus, the user calendar is updated independent of a user input identifying the buffer time block.

In some implementations of the method, non-transitory computer readable medium, or apparatus, based on an identification of a second event time block within the user calendar, the buffer time block fills the time between the event time block and the second event time block.

In some implementations of the method, non-transitory computer readable medium, or apparatus, the buffer time block begins at a user-defined interval prior to a start of the event.

In some implementations of the method, non-transitory computer readable medium, or apparatus, the buffer time block ends at a user-defined interval after an end of the event time block.

In some implementations of the method, non-transitory computer readable medium, or apparatus, the user calendar includes an initial buffer time block and the event occurs during the initial buffer time block, and the method comprises, the operations comprise, or the processor is configured to execute the instructions for determining to begin the buffer time block at a time corresponding to a beginning of the initial buffer time block and to end the buffer time block at a time corresponding to a beginning of the event time block; determining to begin a second buffer time block at a time corresponding to an end of the event time block and to end the second buffer time block at a time corresponding to an end of the initial buffer time block; and updating the user calendar to include the second buffer time block and to remove the initial buffer time block.

In some implementations of the method, non-transitory computer readable medium, or apparatus, the user calendar is updated to include the event time block based on a receipt, at the digital calendar system, of a user input scheduling the event.

In some implementations of the method, non-transitory computer readable medium, or apparatus, the buffer time block begins at a user-defined start time preference.

In some implementations of the method, non-transitory computer readable medium, or apparatus, the buffer time block ends at a user-defined end time preference.

In some implementations of the method, non-transitory computer readable medium, or apparatus, the buffer time block is generated based on past user presence states scheduled by the user in relation to past events in the user calendar.

In some implementations of the method, non-transitory computer readable medium, or apparatus, the buffer time block has a duration greater than one day.

In some implementations of the method, non-transitory computer readable medium, or apparatus, the buffer time block begins at a time corresponding to a start of a workday for the user.

In some implementations of the method, non-transitory computer readable medium, or apparatus, based on an identification of a second event time block occurring on another day within the user calendar, the buffer time block fills the time between the event time block and the second event time block.

In some implementations of the method, non-transitory computer readable medium, or apparatus, the buffer time block is generated in view of past user-defined buffer time blocks in relation to past events in the user calendar.

In some implementations of the method, non-transitory computer readable medium, or apparatus, the buffer time block begins at a user-defined start time preference and ends at a user-defined end time preference.

In some implementations of the method, non-transitory computer readable medium, or apparatus, the buffer time block ends at a time corresponding to the end of a workday.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
providing, by a server-side processing system of a unified communications as a service (UCaaS) platform, a digital calendar that manages availability of resources that require scheduled availability and that organizes associations between the resources and events, to a client device associated with a first user and configured to display the digital calendar, wherein the server-side processing system maintains and provides updated digital calendars for multiple users that are accessible via the digital calendar;
receiving, by the server-side processing system, presence settings and historical activity of the first user from the client device, wherein the historical activity of the first user is measured by the client device based on attendance activity of the first user and the digital calendar;
updating, by the server-side processing system, the digital calendar to include an event time block associated with an event for the first user based on the first user accepting an invite to the event via the client device or based on the first user creating the event via the client device;
generating, automatically by the server-side processing system, a first buffer time block for the digital calendar based on the presence settings and the historical activity of the first user, wherein the first buffer time block indicates that a presence state of the first user is busy for a duration of the first buffer time block;
updating, by the server-side processing system, the historical activity of the first user based on the attendance activity of the first user and activity of the first user before and after the event measured by the client device;
updating, by the server-side processing system, the digital calendar to include a second event time block associated with a second event for the first user;
generating, automatically by the server-side processing system, a second buffer time block for the digital calendar based on the first buffer time block, the presence settings, and the historical activity of the first user, wherein a duration of the second buffer time block is determined using the duration of the first buffer time block and the second buffer time block indicates that the presence state of the first user is busy for the duration of the second buffer time block;
updating, by the server-side processing system, the digital calendar to include the second buffer time block temporally adjacent to the second event time block;
providing, by the server-side processing system, the digital calendar including the second buffer time block and the second event time block to the client device of the first user; and
providing, by the server-side processing system, the digital calendar indicating the presence state of the first user is busy for the duration of the second buffer time block and the second event time block to a client device associated with a second user.

2. The method of claim 1, wherein generating the second buffer time block is based on a user setting for a default presence state.

3. The method of claim 1, wherein generating the second buffer time block is in view of past user presence states in relation to past events in the digital calendar.

4. The method of claim 1, wherein the digital calendar is updated independent of a user input identifying the second buffer time block.

5. The method of claim 1, wherein the second buffer time block fills a time between the event time block and the second event time block.

6. The method of claim 1, wherein the second buffer time block begins at a user-defined interval prior to a start of the second event.

7. The method of claim 1, wherein the second buffer time block ends at a user-defined interval after an end of the second event time block.

8. The method of claim 1, wherein the digital calendar includes an initial buffer time block and the event occurs during the initial buffer time block, the method further comprising:
determining to begin the first buffer time block at a time corresponding to a beginning of the initial buffer time block and to end the first buffer time block at a time corresponding to a beginning of the event time block;
determining to begin a third buffer time block at a time corresponding to an end of the event time block and to end the third buffer time block at a time corresponding to an end of the initial buffer time block; and
updating the digital calendar to include the third buffer time block and to remove the initial buffer time block.

9. The method of claim 1, wherein the digital calendar is updated to include the event time block based on a receipt, at the digital calendar, of a user input scheduling the event.

10. The method of claim 1, wherein the first buffer time block begins at a user-defined start time preference.

11. The method of claim 1, wherein the first buffer time block ends at a user-defined end time preference.

12. An apparatus, comprising:
a memory; and
a server-side processor of a unified communications as a service (UCaaS) platform configured to execute instructions stored in the memory to:
provide a digital calendar that manages availability of resources that require scheduled availability and that organizes associations between the resources and events, to a client device associated with a first user and configured to display the digital calendar, wherein the server-side processor maintains and provides updated digital calendars for multiple users that are accessible via the digital calendar;

receive presence settings and historical activity of the first user from the client device, wherein the historical activity of the first user is measured by the client device based on attendance activity of the first user and the digital calendar;

update the digital calendar to include an event time block associated with an event for the first user based on the first user accepting an invite to the event via the client device or based on the first user creating the event via the client device;

generate, automatically, a first buffer time block for the digital calendar based on the presence settings and the historical activity of the first user, wherein the first buffer time block indicates that a presence state of the first user is busy for a duration of the first buffer time block;

update the historical activity of the first user based on the attendance activity of the first user and activity of the first user before and after the event measured by the client device;

update the digital calendar to include a second event time block associated with a second event for the first user;

generate, automatically, a second buffer time block for the digital calendar based on the first buffer time block, the presence settings, and the historical activity of the first user, wherein a duration of the second buffer time block is determined using the duration of the first buffer time block and the second buffer time block indicates that the presence state of the first user is busy for the duration of the second buffer time block;

update the digital calendar to include the second buffer time block temporally adjacent to the second event time block;

provide the digital calendar including the second buffer time block and the second event time block to the client device of the first user; and provide the digital calendar indicating the presence state of the first user is busy for the duration of the second buffer time block and the second event time block to a client device associated with a second user.

13. The apparatus of claim 12, wherein the second buffer time block is generated based on past user presence states scheduled by the first user in relation to past events in the digital calendar.

14. The apparatus of claim 12, wherein the second buffer time block has a duration greater than one day.

15. The apparatus of claim 12, wherein the second buffer time block begins at a time corresponding to a start of a workday for the first user.

16. The apparatus of claim 12, wherein the second event time block occurs on another day within the digital calendar, and the second buffer time block fills a time between the event time block and the second event time block.

17. A non-transitory computer readable medium storing instructions operable to cause one or more processors of a server-side processing system to perform operations comprising:

providing, by the server-side processing system of a unified communications as a service (UCaaS) platform, a digital calendar that manages availability of resources that require scheduled availability and that organizes associations between the resources and events, to a client device associated with a first user and configured to display the digital calendar, wherein the server-side processing system maintains and provides updated digital calendars for multiple users that are accessible via the digital calendar;

receiving, by the server-side processing system, presence settings and historical activity of the first user from the client device, wherein the historical activity of the first user is measured by the client device based on attendance activity of the first user and the digital calendar;

updating, by the server-side processing system, the digital calendar to include an event time block associated with an event for the first user based on the first user accepting an invite to the event via the client device or based on the first user creating the event via the client device;

generating, automatically by the server-side processing system, a first buffer time block for the digital calendar based on the presence settings and the historical activity of the first user, wherein the first buffer time block indicates that a presence state of the first user is busy for a duration of the first buffer time block;

updating, by the server-side processing system, the historical activity of the first user based on the attendance activity of the first user and activity of the first user before and after the event measured by the client device;

updating, by the server-side processing system, the digital calendar to include a second event time block associated with a second event for the first user;

generating, automatically by the server-side processing system, a second buffer time block for the digital calendar based on the first buffer time block, the presence settings, and the historical activity of the first user, wherein a duration of the second buffer time block is determined using the duration of the first buffer time block and the second buffer time block indicates that the presence state of the first user is busy for the duration of the second buffer time block;

updating, by the server-side processing system, the digital calendar to include the second buffer time block temporally adjacent to the second event time block;

providing, by the server-side processing system, the digital calendar including the second buffer time block and the second event time block to the client device of the first user; and providing, by the server-side processing system, the digital calendar indicating the presence state of the first user is busy for a duration of the second buffer time block and the second event time block to a client device associated with a second user.

18. The non-transitory computer readable medium of claim 17, wherein the second buffer time block is generated in view of past user-defined buffer time blocks in relation to past events in the digital calendar.

19. The non-transitory computer readable medium of claim 17, wherein the first buffer time block begins at a user-defined start time preference and ends at a user-defined end time preference.

20. The non-transitory computer readable medium of claim 17, wherein the second buffer time block ends at a time corresponding to an end of a workday.

* * * * *